United States Patent
Yamashiro

(10) Patent No.: US 9,092,311 B2
(45) Date of Patent: Jul. 28, 2015

(54) VEHICULAR WIRELESS COMMUNICATION APPARATUS

(71) Applicant: DENSO CORPORATION, Kariya, Aichi-pref. (JP)

(72) Inventor: Takahisa Yamashiro, Chiryu (JP)

(73) Assignee: DENSO CORPORATION, Kariya (JP)

(*) Notice: Subject to any disclaimer, the term of this patent is extended or adjusted under 35 U.S.C. 154(b) by 361 days.

(21) Appl. No.: 13/855,147

(22) Filed: Apr. 2, 2013

(65) Prior Publication Data
US 2013/0268186 A1 Oct. 10, 2013

(30) Foreign Application Priority Data

Apr. 4, 2012 (JP) ................................. 2012-085775

(51) Int. Cl.
| | |
|---|---|
| G01C 22/00 | (2006.01) |
| G06F 17/00 | (2006.01) |
| G05D 1/02 | (2006.01) |
| G08G 1/16 | (2006.01) |

(52) U.S. Cl.
CPC ................ G06F 17/00 (2013.01); G05D 1/021 (2013.01); G08G 1/163 (2013.01)

(58) Field of Classification Search
CPC .............. G05D 1/0297; G05D 1/0295; G05D 2201/0213; G05D 1/0088; G05D 1/0229; G05D 1/0291; G05D 1/0293
USPC .......................................................... 701/23
See application file for complete search history.

(56) References Cited

U.S. PATENT DOCUMENTS

| | | | | |
|---|---|---|---|---|
| 5,832,400 | A * | 11/1998 | Takahashi et al. | 701/53 |
| 7,062,381 | B1 * | 6/2006 | Rekow et al. | 701/300 |
| 8,116,921 | B2 * | 2/2012 | Ferrin et al. | 701/1 |
| 8,930,058 | B1 * | 1/2015 | Quist et al. | 701/23 |
| 2003/0009271 | A1 | 1/2003 | Akiyama | |
| 2003/0103482 | A1 | 6/2003 | Van Bosch | |

FOREIGN PATENT DOCUMENTS

| | | |
|---|---|---|
| JP | 2004-138538 | 5/2004 |
| JP | 2010-146177 | 7/2010 |

OTHER PUBLICATIONS

Office action dated Mar. 11, 2014 in corresponding Japanese Application No. 2012-085775.

* cited by examiner

Primary Examiner — Helal A Algahaim
Assistant Examiner — Paul Castro
(74) Attorney, Agent, or Firm — Harness, Dickey & Pierce, PLC

(57) ABSTRACT

In a vehicular wireless communication apparatus in a subject vehicle, a rear vehicle determination process determines whether another vehicle is a rear vehicle within a predetermined range based on a past locus of the subject vehicle determined by a subject-vehicle locus determination process, and a locus information-set of the another vehicle received by a wireless communication portion. When the another vehicle is determined to be the rear vehicle, a necessary-position determination process determines position information-items of two end points of a line segment of the past locus of the subject vehicle which intersects with a perpendicular line drawn from a present position of the another vehicle. A simple transmission process transmits a locus information-set including (i) a present position information-item of the subject vehicle and (ii) the necessary-position information-item determined in the necessary-position determination process, from the wireless communication portion.

20 Claims, 7 Drawing Sheets

VEHICULAR WIRELESS COMMUNICATION APPARATUS

CROSS REFERENCE TO RELATED APPLICATION

The present application is based on Japanese Patent Application No. 2012-85775 filed on Apr. 4, 2012, the disclosure of which is incorporated herein by reference.

TECHNICAL FIELD

The present disclosure relates to a vehicular wireless communication apparatus.

BACKGROUND ART

[Patent Literature 1] JP 2010-146177 A

A technology is known where a subject vehicle obtains a relative position relation with other vehicles (i.e., target vehicles) using information transmitted from the target vehicles by vehicle-to-vehicle communication without using map information. For example, Patent Literature 1 discloses a technology as follows. A subject vehicle measures a coordinate of an own present position continuously while obtaining coordinates of positions of target vehicles by vehicle-to-vehicle communication continuously. A travel locus of a front vehicle is prepared on a virtual plane; the travel locus of the front vehicle is combined with a coordinate of a present position of another vehicle, thereby determining whether both of the front vehicle and another vehicle travel the same road.

In Patent Literature 1, a single coordinate of a present position (i.e., present position information-item) is transmitted periodically, i.e., multiple times; thereby, the preparation of the travel locus is enabled at a receiving side. Multiple present position information-items that are equivalent to a travel locus may be transmitted and received at once by vehicle-to-vehicle communication; thereby, the relative position relation between the subject vehicle and the target vehicle may be obtained only by one transmission or one reception.

All vehicles may transmit and receive multiple position information-items by vehicle-to-vehicle communication in a state where the vehicles density on road is high. In such a case, the amount of data communication increases as compared with the case where only one position information-item is transmitted and received at once; therefore, a congestion is caused in the vehicle-to-vehicle communication.

SUMMARY

It is an object of the present disclosure to provide a vehicular wireless communication apparatus, which transmits multiple position information-items of a subject vehicle by vehicle-to-vehicle communication, permitting another vehicle as a transmission destination to obtain a position relation with the subject vehicle while helping prevent congestion in the vehicle-to-vehicle communication.

To achieve the above object, according to an aspect of the present disclosure, a vehicular wireless communication apparatus disposed in a subject vehicle is provides as including a position acquisition portion, a communication portion, a subject-vehicle locus determination section, a rear vehicle determination section, a necessary-position determination section, and a transmission information control section. The position acquisition portion acquires continuously a position information-item. The communication portion transmits and receives a vehicle information-set, which includes a locus information-set continuously via vehicle-to-vehicle communication. The subject-vehicle locus determination section determines a past locus of the subject vehicle from a plurality of position information-items of the subject vehicle continuously acquired by the position acquisition portion. The rear vehicle determination section determines, based on the locus information-set received from another vehicle by the communication portion, whether the another vehicle is a rear vehicle, which is located at back of the subject vehicle and within a predetermined range from the past locus of the subject vehicle. The necessary-position determination section determines a necessary-position information-item based on the plurality of position information-items of the subject vehicle when the another vehicle is determined to be the rear vehicle, the necessary-position information-item being necessary for the rear vehicle when the rear vehicle obtains a position relation with the subject vehicle. The transmission information control section controls the communication portion to transmit the locus information-set of the subject vehicle when the another vehicle is determined to be the rear vehicle such that the locus information-set of the subject vehicle includes (i) a present position information-item of the subject vehicle and (ii) the necessary-position information-item determined by the necessary-position determination section.

According to this configuration, the necessary-position determination section determines or selects, based on multiple position information-items continuously acquired by the position acquisition portion, a necessary-position information-item that is necessary for a rear vehicle located within a predetermined range from the travel locus of the subject vehicle when the rear vehicle obtains a position relation with the subject vehicle. This configuration can prevent the transmission of unnecessary position information-items for the rear vehicle when the rear vehicle obtains the position relation with the subject vehicle. Therefore, when transmitting the position information-items of the subject vehicle by vehicle-to-vehicle communications, the transmission amount of the position information-items can be reduced.

In addition, even though the transmission amount of the position information-items is suppressed, the position information-items necessary for the rear vehicle to obtain a position relation with the subject vehicle can be transmitted properly. This permits the rear vehicle as a transmission destination to obtain the position relation with the subject vehicle while helping prevent congestion in the vehicle-to-vehicle communication. As a result, when multiple position information-items of the subject vehicle are transmitted by vehicle-to-vehicle communication, another vehicle as a transmission destination is permitted to obtain a position relation with the subject vehicle while helping prevent congestion in the vehicle-to-vehicle communication.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiments of the present disclosure are explained with reference to drawings.

It is noted Basic Japanese Patent Application, which the present application claims the priority based on, uses a Japanese word equivalent to "information" primarily as being a countable noun from the nature of Japanese language. The present application may therefore use "an information-item"/"information-items" or "an information-set"/"information-sets" so as to explicitly indicate singular/plural, respectively, instead of using "information."

First Embodiment

Figure 1:
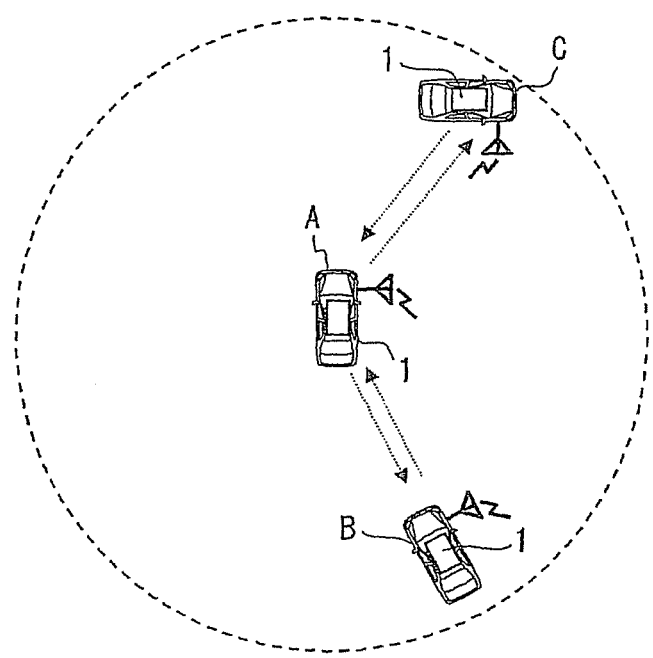
FIG. 1 is a block diagram illustrating a configuration of a vehicular communication system according to embodiments of the present disclosure.

With reference to FIG. 1, a vehicular communication system 100 includes multiple vehicular wireless communication apparatuses 1 mounted in vehicles (vehicle A, vehicle B, vehicle C), respectively. The vehicles A, B, C may be also referred to as host vehicles where wireless communication apparatuses 1 are mounted. The circle indicated with broken lines in FIG. 1 is a communication range of vehicle-to-vehicle communication for the wireless communications apparatus 1 of the vehicle A.

The wireless communication apparatus 1 is mounted in a vehicle such as automobile. In the present embodiment, the vehicles A, B, C may be automobiles. Although FIG. 1 illustrates a configuration of the vehicular communication system 100 including three wireless communication apparatuses 1, there is no need to be limited thereto. As long as the vehicular communication system 100 includes a plurality of wireless communication apparatuses 1 mounted in vehicles; the number of wireless communication apparatuses 1 may be other than three.

As an example, in the vehicular communication system 100 according to the present embodiment, a single wireless communication apparatus 1 is mounted in each of the vehicles A, B, C or host vehicle. Further, it is premised that the vehicle B travels at the back of the vehicle A on the same traffic lane (in other word, the vehicle A travels ahead of the vehicle B on the same traffic lane), and the vehicle C travels a road different from a road which the vehicle A travels.

Figure 2:
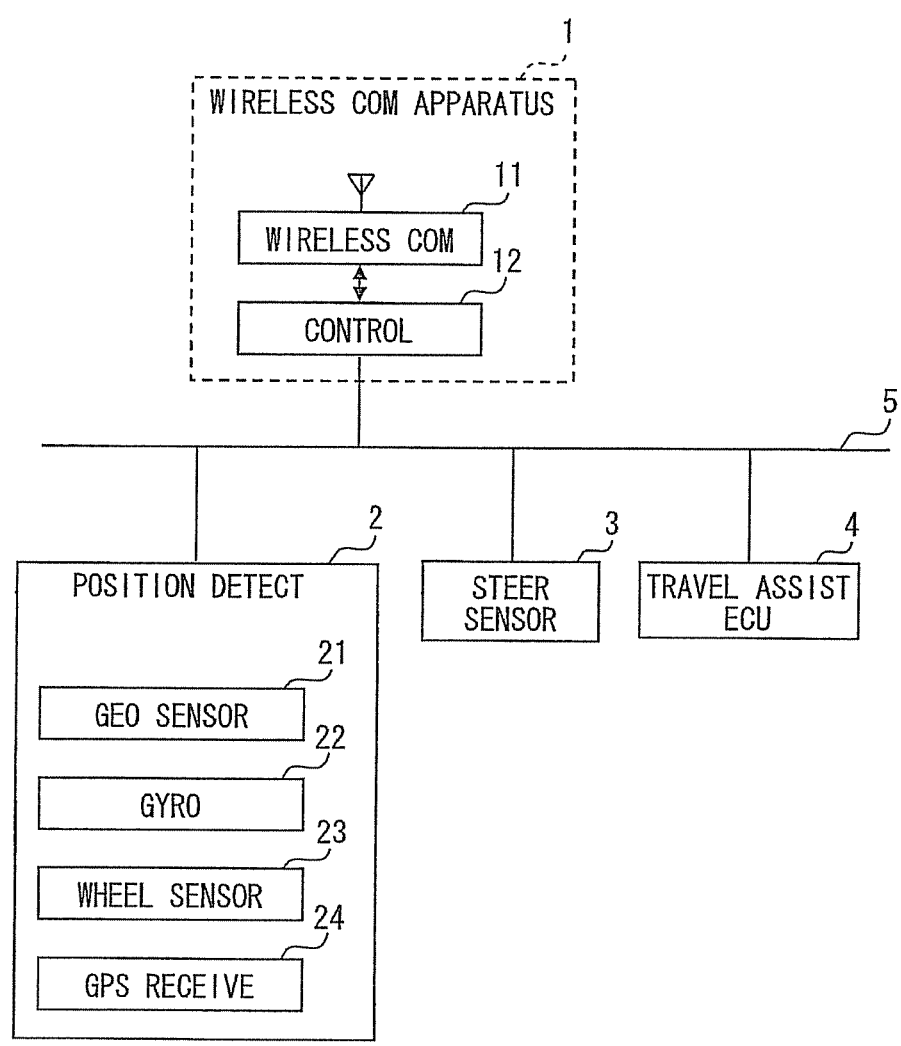
FIG. 2 is a block diagram illustrating a configuration of a vehicular wireless communication apparatus.

The following will explain an outline configuration of the wireless communication apparatus 1 with reference to FIG. 2. It is premised that the wireless communication apparatus 1 is mounted in a subject vehicle that is any one of the host vehicles A, B, C. The wireless communication apparatus 1 of the subject vehicle includes a wireless communication portion 11 and a control circuit 12.

In addition, the wireless communication apparatus 1 is connected with a position detection unit 2, a steering angle sensor 3, and a travel assist ECU (Electronic Control Unit) 4, for communicating signals (data or information-items). The wireless communication apparatus 1, position detection unit 2, steering angle sensor 3, and travel assist ECU 4 are mutually connected via an in-vehicle LAN (Local Area Network) 5 compliant with communication protocols such as CAN (Controller Area Network).

The position detection unit 2 detects continuously or periodically a present position of the subject vehicle based on information acquired from sensors. The sensors include a geomagnetic sensor 21 to detect geomagnetism; a gyroscope 22 to detect an angular speed around a perpendicular direction of the subject vehicle; a wheel speed sensor 23 to detect a speed of the subject vehicle from a rotation speed of each rotating wheel; and a GPS receiver 24 for GPS (Global Positioning System) to detect a present position of the subject vehicle based on electric waves from artificial satellites. The position of the subject vehicle is represented by a coordinate (a latitude and a longitude), which may be referred to as a position information-item.

The individual sensors have different types of detection errors from each other; therefore, they are used to complement each other. In addition, the position detection unit 2 may include part of the above sensors depending on an accuracy of each sensor, or may further include a sensor other than the above sensors.

In addition, although the present embodiment indicates a configuration which uses the GPS receiver 24 for GPS as a receiver of a global positioning system, there is no need to be limited to the above. For example, the configuration may use a receiver of a global positioning system other than GPS.

The steering angle sensor 3 detects a steering angle of the steering wheel of the subject vehicle; the steering angle is a rotation angle from a neutral position (zero degree) where the subject vehicle runs straight. When the steering wheel is rotated clockwise (to the right) from the neutral position, the steering angle is outputted with a sign of positive (+); when rotated anti-clockwise (to the left) from the neutral position, the steering angle is outputted with a sign of negative (−).

The wireless communication portion 11 of the wireless communication apparatus 1 includes a transmission and reception antenna, to perform vehicle-to-vehicle communication to communicate (transmit and receive) information-items or data with a peripheral vehicle as another vehicle or target vehicle via wireless communication without using a telephone network; the peripheral vehicle is a vehicle present in a surrounding area of the subject vehicle.

For example, when the wireless communication uses radio waves of a 700 MHz band, the vehicle-to-vehicle communication may be made among peripheral vehicles in a range of 1 km in radius centering on the position of the subject vehicle. For example, when the wireless communication uses radio waves of a 5.9 GHz band, the vehicle-to-vehicle communication may be made among peripheral vehicles in a range of 500 m in radius centering on the position of the subject vehicle. The wireless communication portion 11 may be also referred to as a transmission portion or means and/or a reception portion or means.

The wireless communication portion 11 transmits data or information-items according to instructions of the control circuit 12. In addition, the wireless communication portion 11 receives data or information-items transmitted from the wireless communication apparatus 1 of another vehicle, and inputs it into the control circuit 12.

The control circuit 12 of the wireless communication apparatus 1 is a known computer to contain a CPU, ROM, RAM, EEPROM, I/O, and bus line connecting the foregoing components (none shown).

The control circuit 12 executes various kinds of control programs stored in the ROM based on a variety of information inputted from the wireless communication portion 11, the position detection unit 2, and the steering angle sensor 3; thereby, the control circuit 12 executes various kinds of processes such as a transmission amount determination process, which is related with a determination of an amount of position information-items included in a vehicle information-set transmitted from the subject vehicle using vehicle-to-vehicle communication.

The control circuit 12 acquires continuously information-items (i.e., coordinates) on positions of the subject vehicle detected by the position detection unit 2; such information-items may be referred to as position information-items of the subject vehicle (also referred to as position data of the subject vehicle). The control circuit 12 may be also referred to as a position acquisition portion or means. In addition, the control circuit 12 accumulates or stores acquired position information-items in an electrically rewritable memory such as RAM.

The accumulation or collection of the position information-items in the memory is performed by a fixed number (for example, 20 items) or for a fixed time period. When the number of the accumulated position information-items reaches the fixed number or when the fixed time period elapses, the position information-items may be erased from the oldest one.

In addition, the position information-items may be accumulated in the memory so as to be associated with time information-items such as time stamps; the time information-items may be acquired as a GPS clock time when the corresponding position information-item is acquired from the position detection unit 2 or a GPS clock time when the corresponding position information-item is detected by the position detection unit 2.

The present embodiment provides an example case where the accumulation of the position information-items is made by a fixed time period. Further, the present embodiment provides an example case where the number of position information-items accumulated by a fixed time period is changed based on a shape of a road under travel (i.e., a road shape under travel) of the subject vehicle.

For instance, when the subject vehicle is under travel on a straight road such as an expressway, a cycle at which the control circuit 12 acquires a position information-item may be lengthen (e.g., every 500 msec). In contrast, when the subject vehicle is under travel on a meandering road such as a mountain road, a cycle at which the control circuit 12 acquires a position information-item may be shortened (e.g., every 200 msec). Thereby, the number of position information-items by a fixed time period under the travel of the straight road is smaller than the number of position information-items by the same fixed time period under the travel of the meandering road.

The road shape under travel of the subject vehicle may be determined based on the steering angle of the subject vehicle acquired from the steering angle sensor 3. For instance, it may be determined that the subject vehicle is traveling on a straight road when the value of the steering angle continues approximately zero for a time period greater than a fixed time period. Alternatively, it may be determined that the subject vehicle is traveling on a meandering road when the value of the steering angle does not continue approximately zero for a time period greater than a fixed time period.

Further, a road shape may be determined based on shapes of line segments connecting shape interpolation points of map data inputted into a map data input unit (unshown). In addition, when a road shape is straight, the number of shape interpolation points is apt to be small, thereby lengthening line segments, respectively. Thus, a road shape may be determined based on the length of a line segment of the map data.

In addition, the control circuit 12 reads the position information-items accumulated in the memory at each fixed cycle (for example, 100 msec), and transmits them via the wireless communication portion 11. Thus, the position information-items are transmitted with fixed transmission cycles (for example, 100 msec). When transmitting the position information-items, the control circuit 12 also transmits a present position information-item (the newest position information-item of the subject vehicle). That is, the control circuit 12 of the wireless communication apparatus 1 transmits a locus information-set that includes more than one position information-item including a present position information-item and previous (past) position information-items of the subject vehicle.

Furthermore, the control circuit 12 also acquires continuously the information-item on manipulation, the information-item on the quantity of motion, and the information-item on the heading direction of the subject vehicle, and transmits them along with the locus information-set via the wireless communication portion 11. The information-item on the heading direction of the subject vehicle (henceforth, heading direction information-item) is an orientation angle of the subject vehicle, for example. The orientation angle of the subject vehicle may be calculated based on outputs of the geomagnetic sensor 21. The orientation angle may be quantified or expressed on a basis of the north direction, for example.

The information-item on manipulation of the subject vehicle (i.e., manipulation information-item) includes a steering angle acquired from the steering angle sensor 3. The manipulation information-item may further include a braking pressure. The information-item on the quantity of motion of the subject vehicle includes a vehicle speed and a yaw rate. The vehicle speed may be acquired from the wheel speed sensor 23. The yaw rate may be acquired using the gyroscope 22.

Thus, the control circuit 12 transmits a vehicle information-set, which includes the locus information-set, the heading direction information-item, the manipulation information-item, and the information-item on the quantity of motion, via the wireless communication portion 11. When transmitting the vehicle information-set, the control circuit 12 may add a time stamp such as a GPS clock time that indicates a clock time at which each information-item included in the vehicle information-set is detected, for instance.

Further, when transmitting the vehicle information-set, the control circuit 12 may add identification information-item that specifies a transmission source of the vehicle information-set such as a vehicle ID of the subject vehicle or an apparatus ID of the wireless communication apparatus 1. In addition, the identification information-item may be fixed, or changed at random every fixed time period.

The following will explain the case where the wireless communication apparatus 1 of a subject vehicle of the vehicles A, B, C communicates with the wireless communication apparatus 1 of each target vehicle (i.e., another vehicle different from the subject vehicle) of the vehicles A, B, C other than the subject vehicle. As explained above, the control circuit 12 of the wireless communication apparatus 1 of the subject vehicle transmits a vehicle information-set via the wireless communication portion 11 of the subject vehicle. In addition, the control circuit 12 of the subject vehicle acquires a vehicle information-set of each target vehicle via the wireless communication portion 11 of the subject vehicle. That is, vehicle information-sets are continuously transmitted from the wireless communication apparatuses 1 mounted in target vehicles within the communication range of the vehicle-to-vehicle communication. The control circuit 12 of the subject vehicle outputs the received vehicle information-set(s) of the target vehicle(s) to the travel assist ECU 4 of the subject vehicle.

The travel assist ECU 4 mainly includes a known microcomputer containing a CPU, memories such as ROM, RAM, EEPROM, I/O, and a bus connecting the foregoing components. The travel assist ECU 4 executes a travel assist application based on a variety of information-items inputted from the wireless communication apparatus 1, the position detection unit 2, and the steering angle sensor 3.

For example, the travel assist ECU 4 of the subject vehicle calculates a position relationship between the subject vehicle and a target vehicle based on the vehicle information-set of the target vehicle inputted from the wireless communication apparatus 1, and the vehicle information-set of the subject vehicle obtained from the sensors of the subject vehicle such as the position detection unit 2 and steering angle sensor 3. The travel assist ECU 4 then executes a travel assist application according to the calculated position relationship. It is noted that vehicle information-sets may be acquired from more than one target vehicle.

For instance, the travel assist ECU 4 of the subject vehicle calculates a closest position of a target vehicle (i.e., another vehicle) based on the present position of the subject vehicle, an estimated future locus of the subject vehicle, and the position information-item of the target vehicle. The closest position of a target vehicle signifies the position of the target vehicle that is closest to the present position or estimated future locus of the subject vehicle. Then, it is determined whether the target vehicle is a front vehicle ahead of the subject vehicle based on (i) the distance from the present position or estimated future locus of the subject vehicle to the closest position of the target vehicle and (ii) the heading directions of the subject vehicle and target vehicle at the closest position of the target vehicle. Further, when a sudden braking of a front vehicle is detected based on the brake pressure in the manipulation information-item of the front vehicle, a travel assist is made which notifies the driver of the subject vehicle of the sudden braking of the front vehicle. The determination method of an estimated future locus will be explained later.

Figure 3:
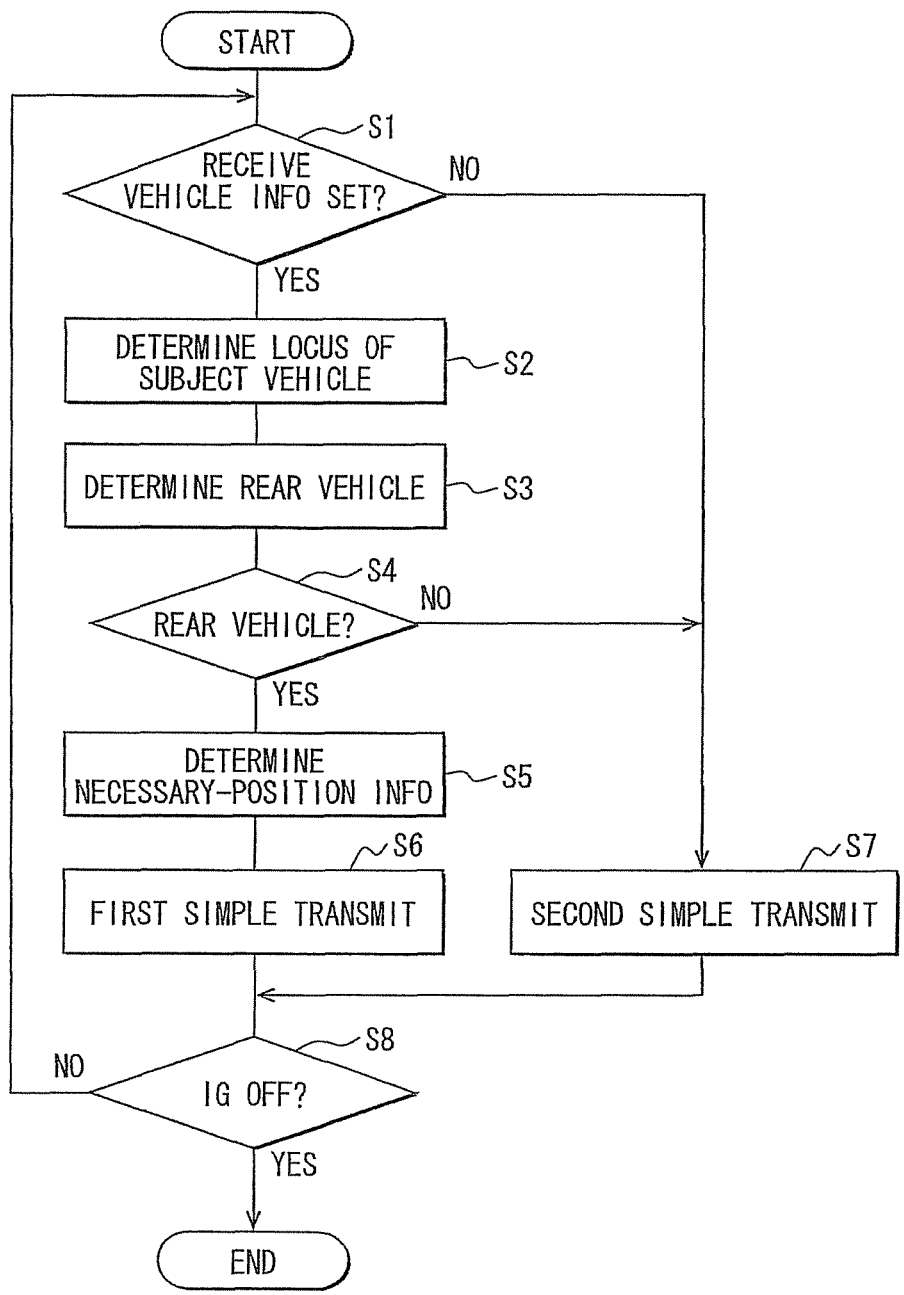
FIG. 3 is a flowchart diagram illustrating an example of a transmission amount determination process by a control circuit of a vehicular wireless communication apparatus according to a first embodiment.

The following will explain a flowchart of a transmission amount determination process by the control circuit 12 of the wireless communication apparatus 1 of the subject vehicle with reference to FIG. 3. It is further noted that a flowchart in the present application includes sections (also referred to as steps), which are represented, for instance, as S1. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section, including or not including a function of a related apparatus. Further, the hardware section may be inside of a microcomputer. The flowchart is started when the ignition power source of the subject vehicle is turned on or turned into an on state, for example.

First, at S1, the control circuit 12 of the wireless communication apparatus 1 of the subject vehicle determines whether a vehicle information-set is received from the wireless communication apparatus 1 of another vehicle (i.e., target vehicle) for a fixed time period. For instance, when a vehicle information-set received by the wireless communication portion 11 of the subject vehicle is inputted to the control circuit 12 within a fixed time period, it is determined that a vehicle information-set is received for the fixed time period. In contrast, when a vehicle information-set received by the wireless communication portion 11 of the subject vehicle is not inputted to the control circuit 12 within the fixed time period, it is determined that a vehicle information-set is not received for the fixed time period. The fixed time period signifies a time period that is designated as needed. For example, the fixed time period may be a value similar to a transmission cycle of a vehicle information-set, or a value of several seconds. The present embodiment adopts 100 msec as a fixed time period.

When it is determined that the vehicle information-set is received for the fixed time period (S1: Yes), the flow moves to S2. When it is determined that the vehicle information-set is not received for the fixed time period (S1: No), the flow moves to S7.

At S2, a subject-vehicle locus determination process is performed. The flow then moves to S3. The subject-vehicle locus determination process defines a past locus of the subject vehicle as a group of line segments, which connect a point indicated by a present position of the subject vehicle and points indicated by multiple past position information-items of the subject vehicle accumulated in the memory. The processing at S2 may be referred to as a subject-vehicle locus determination section or means.

At S3, a rear vehicle determination process is performed. The flow then moves to S4. The rear vehicle determination process determines whether a target vehicle is a rear vehicle, which is located at a position within a predetermined range from the past locus of the subject vehicle. For instance, this determination is made based on the past locus of the subject vehicle determined by the subject-vehicle locus determination process, the present position information-item of the target vehicle, the heading direction information-item (orientation angle) of the target vehicle, and the heading direction information-item (orientation angle) of the subject vehicle. The processing at S3 may be referred to as a rear vehicle determination section or means. The present position information-item of the target vehicle indicates the newest position information-item among the position information-items included in the locus information-set of the target vehicle.

As an example, the rear vehicle determination process is performed as follows. First, a perpendicular line is designated to be drawn from a point (referred to as a target-vehicle present position) indicated by the present position information-item of the target vehicle to a designated line segment that is one of line segments included in the past locus of the subject vehicle. Then, a closest distance is calculated as a distance from the present position of the target vehicle to a designated intersecting point that is an intersecting point between (i) the designated perpendicular line and (ii) the designated line segment included in the past locus of the subject vehicle. Then, it is determined whether the calculated closest distance is equal to or less than a predetermined distance. The predetermined distance may be a value designated as needed; for instance, it may be similar to an error of measurement of the present position of the subject vehicle by the position detection unit 2.

Further, it is determined whether an orientation difference between (i) an orientation angle (an angle of the direction) of the designated line segment in the past locus of the subject vehicle and (ii) an orientation angle of the target vehicle is equal to or less than a predetermined value. The predetermined value may be a value designated as needed; for instance, it may be similar to an error of measurement or calculation of the orientation angle of the subject vehicle or the target vehicle.

Furthermore, it is determined whether the target vehicle is present at the back of the subject vehicle. For example, a two-dimensional coordinate system (latitude=y coordinate or axis, longitude=x coordinate or axis) is designated to contain a present position of the subject vehicle as an origin, while assigning the direction of the orientation angle of the subject vehicle with a positive direction of the y axis. Then, the present position of the target vehicle is placed on the coordinate system. When the y coordinate of the present position of the target vehicle is a negative value, it may be determined that the target vehicle is present at the back of the subject vehicle.

For instance, the orientation angle of the subject vehicle is obtained as follows. Several positions are selected from the past locus of the subject vehicle; the several positions include the present position and predetermined multiple past positions. An approximate straight line is obtained based on the several positions with the least-squares method; an orientation angle of the approximate straight line is then obtained as the orientation angle of the subject vehicle.

The rear vehicle determination process determines that the target vehicle is a rear vehicle with respect to the subject vehicle when the following determination conditions are simultaneously satisfied: the closest distance is equal to or less a predetermined distance; the orientation difference between the subject vehicle and the target vehicle is equal to or less than a predetermined value; and the target vehicle is present at the back of the subject vehicle. In addition, when any one of the above conditions is not satisfied, it is determined that the target vehicle is not a rear vehicle with respect to the subject vehicle.

It is noted that the determination as to whether the orientation difference between the subject vehicle and the target vehicle is equal to or less than a predetermined value may be not included in the above determination conditions. For instance, it may be determined that the heading directions of the subject vehicle and target vehicle are approximately the same based on based on the past locus of the subject vehicle and the past locus of the target vehicle, which is obtained from the locus information-set of the target vehicle. Such determination may be substituted to replace the determination that the orientation difference between the subject vehicle and the target vehicle is equal to or less than a predetermined value.

At S4, when it is determined that the rear vehicle determination process determines that the target vehicle is a rear vehicle (S4: Yes), the flow proceeds to S5. In contrast, at S4, when it is determined that the rear vehicle determination process determines that the target vehicle is not a rear vehicle (S4: No), the flow proceeds to S7.

At S5, a necessary-position determination process is performed. The flow then moves to S6. The necessary-position determination process determines a position information-item of a point necessary for a rear vehicle to obtain a position relation with the subject vehicle. The processing at S5 may be referred to as a necessary-position determination section or means.

As an example, the necessary-position determination process takes place as follows. First, position information-items on two end points of the above designated line segment are determined; as explained above, the designated line segment is included in the line segments of the past locus of the subject vehicle and intersecting with the designated perpendicular line from the present position of the target vehicle. Further, the above two end points of the designated line segment may be referred to as closest line segment end points. The determined position information-items of the closest line segment end points are selected from the multiple past position information-items of the subject vehicle accumulated in the above-mentioned memory. The selected position information-items are determined as a necessary-position information-item of a point necessary for a rear vehicle to obtain a position relation with the subject vehicle. The processing at S5 may be referred to as a first closest point determination section or means.

The necessary-position determination process may take place as a following configuration (modification 1). In the necessary-position determination process of the modification 1, the coordinate of a closest point is calculated; the closest point is a point at which (i) the above designated perpendicular line from the present position of the target vehicle and (ii) the designated line segment of the past locus of the subject vehicle. Thereby, the position information-item corresponding to the closest point is prepared. The, the position information-item of the closest point is determined as a necessary-position information-item of a point necessary for a rear vehicle to obtain a position relationship with the subject vehicle. The control circuit 12 may be also referred to as a closest point preparation section or means.

At S6, a first simple transmission process is performed. The flow then moves to S8. The first simple transmission process transmits the vehicle information-set of the subject vehicle from the wireless communication portion 11 according to a transmission timing; this vehicle information-set includes the locus information-set containing (i) the position information-item determined as the necessary-position information-item in the necessary-position determination process, and (ii) the present position information-item of the subject vehicle. The processing at S6 may be referred to as a transmission information control section or means.

At S7, a second simple transmission process is performed. The flow then moves to S8. For instance, the second simple transmission process may transmit the vehicle information-set which includes the present position information-item of the subject vehicle, instead of the locus information-set, from the wireless communication portion 11 according to a transmission timing. In this case, the transmitted vehicle information-set may favorably remove the manipulation information-item and the information-item of the quantity of motion.

At S1, it may be determined that any vehicle information-set is not received for a fixed time period. This may assume the case where there is no other vehicles as a target of the vehicle-to-vehicle communication in a periphery and there is a low possibility to cause a congestion in the vehicle-to-vehicle communication even when the locus information-set contains a large amount of the position information-items. Thus, a usual transmission process may be adopted. This usual transmission process transmits the vehicle information-set, which contains the locus information-set having (i) all the past position information-items of the subject vehicle accumulated in the above-mentioned memory, and (ii) the present position information of the subject vehicle, from the wireless communication portion 11 according to a transmission timing.

At S8, when the ignition power source of the subject vehicle is turned off or into an off state (S8: Yes), the flow ends. In addition, when the ignition power source of the subject vehicle is not turned off or into an off state (S8: No), the flow returns to S1 and the above sections or steps are repeated.

A rear vehicle (e.g., vehicle B) receives the vehicle information-set transmitted by the first simple transmission process from the subject vehicle (e.g., vehicle A). The travel assist ECU 4 of the vehicle B obtains a position relation between the vehicle A and the vehicle B based on (i) the received vehicle information-set of the vehicle A and (ii) the vehicle information-set of the vehicle B from the position detection unit 2 or the steering angle sensor 3 of the vehicle B; then, it executes a travel assist application mentioned above.

For instance, the locus information-set contained in the vehicle information-set may include the present position information-item of the vehicle A and the position information-items of two end points of the closest line segment of the vehicle A. In this case, a designated line segment is obtained by connecting the two end points of the closest line segment; a designated perpendicular line is drawn from the vehicle B to the designated line segment to find an intersecting point. This intersecting point is obtained as the above mentioned closest position. Whether the vehicle A is a front vehicle ahead of the vehicle B may be determined based on (i) the distance from the present position of the vehicle B to the closest position of the vehicle A and (ii) the heading direction of the vehicle B and the heading direction of the vehicle A at the closest position.

That is, this is the case that the locus information-set transmitted from the vehicle A is limited so as to contain only the present position information-item of the vehicle A and two end points of the closest line segment. Even in this case, the vehicle B can obtain the position relation between the vehicle A and vehicle B such as the front-rear relation between a front vehicle and a rear vehicle, and executes a travel assist application mentioned above. Limiting the contents of the locus information-set transmitted from the vehicle A to only the present position information-item of the vehicle A and two end points of the closest line segment can suppress the data amount of the transmitted position information-items, helping prevent congestion in the vehicle-to-vehicle communication.

Figure 4:
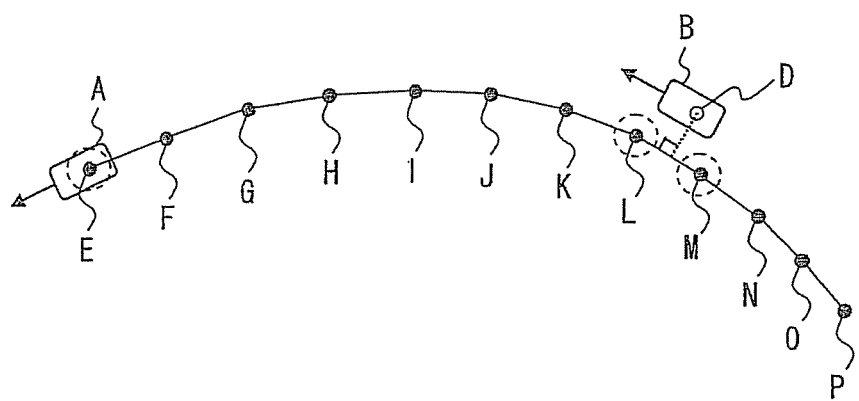
FIG. 4 is a diagram for explaining an advantage according to the first embodiment.

The configuration of the first embodiment can suppress the data amount of the position information-items. This will be explained with reference to FIG. 4. FIG. 4 illustrates the vehicle A and the vehicle B. In addition, the present position information-item of the vehicle A is illustrated as E. The present position information-item of the vehicle B is illustrated as D. The past position information-items of the vehicle A are illustrated as F to P. Furthermore, the end points of the closest line segment with respect to the vehicle B are illustrated as L and M. The position information-items of the points surrounded with the circles of the broken lines are transmitted from the vehicle A to the vehicle B.

For example, when all the past position information-items of the vehicle A accumulated in the above-mentioned memory are the position information-items of the points F to P, the usual transmission process transmits the position information-item of the point of E and the position information-items of the points of F to P as a locus information-set. In contrast, the configuration of the first embodiment can reduce the data amount of the transmitted locus information-set into the position information-item of the point of E and the position information-items of the points of L and M.

Thus, according to the configuration of the first embodiment, when multiple position information-items of a subject vehicle are transmitted by vehicle-to-vehicle communication, a target vehicle as a transmission destination is permitted to obtain a position relation with the subject vehicle while helping prevent congestion in the vehicle-to-vehicle communication.

In addition, in the modification 1, the locus information-set contained in the vehicle information-set contains the present position information-item and the position information-item of a single closest point. In this case, the travel assist ECU 4 may determine the closest point as the closest position. Whether the vehicle A is a front vehicle ahead of the vehicle B may be determined based on (i) the distance from the present position of the vehicle B to the closest position relative to the vehicle B and (ii) the heading directions of the vehicle A and vehicle B at the closest position.

Further, the direction of the line segment connecting the closest point and the present position of the vehicle A may be regarded as the heading direction of the vehicle A. When the vehicle information-set of the vehicle A contains a heading direction information-item of the vehicle A near the closest point, the direction indicated by this heading direction information-item may be regarded as the heading direction of the vehicle A.

That is, this is the case that the contents of the locus information-set transmitted from the vehicle A are limited to the present position information-item of the vehicle A and one closest point. Even in this case, the vehicle B can obtain the position relation between the vehicle A and the vehicle B and execute a travel assist application mentioned above. Limiting the contents of the locus information-set transmitted from the vehicle A to the present position information-item of the vehicle A and one closest point can further suppress the data amount of the transmitted position information-items, helping prevent congestion in the communication.

Figure 5:
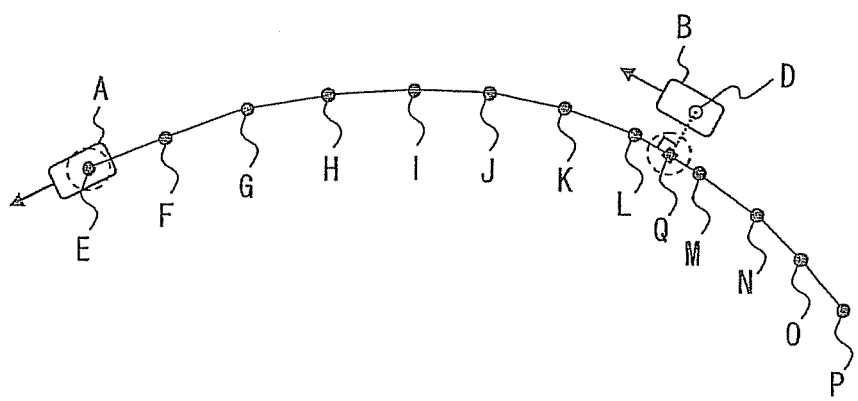
FIG. 5 is a diagram for explaining an advantage according to modification 1.

The configuration of the modification 1 suppressing the data amount of the position information-items will be explained with reference to FIG. 5. FIG. 5 illustrates the vehicle A and the vehicle B. In addition, the present position information-item of the vehicle A is illustrated as E. The present position information-item of the vehicle B is illustrated as D. In addition, the past position information-items of the vehicle A are illustrated as F to P. The closest point is illustrated as Q. The position information-items of the points surrounded with the circles of the broken lines are transmitted from the vehicle A to the vehicle B.

For example, when all the past position information-items of the vehicle A accumulated in the above-mentioned memory are the position information-items of the points F to P, the usual transmission process transmits the position information-item of the point E and the position information-items of the points F to P as a locus information-set. In contrast, the configuration of the modification 1 can reduce the data amount of the transmitted locus information-set into the position information-item of the point E, and the position information-item of the closest point Q.

This configuration can provide an effect similar to that of the first embodiment, further helping prevent the congestion in the vehicle-to-vehicle communication. In addition, when the target vehicle needs the above closest point for obtaining the position relation with the subject vehicle, the subject vehicle can previously prepare the closest point. The processing for obtaining the closest point may be eliminated in the target vehicle.

In addition, the rear vehicle determination process may determine that several rear vehicles are present. In such a case, the necessary-position determination process may determine the necessary-position information-item with respect to only a rear vehicle that is determined to be nearest to the subject vehicle among the several rear vehicles. In this case, the first simple transmission process transmits the locus information-set, which contains (i) the present position information-item of the subject vehicle, and (ii) the position information-item determined in the necessary-position determination process with respect to the nearest rear vehicle. It is noted that the nearest rear vehicle may be defined as a rear vehicle whose present position having the shortest distance with the present position of the subject vehicle among the distances of all the rear vehicles with the present position of the subject vehicle.

Suppose that the rear vehicle determination process determines that several target vehicles are rear vehicles. In this case, the nearest rear vehicle has a possibility of approaching the subject vehicle in a shorter time. Thus, a demand may be strong which obtains the position relation between the nearest rear vehicle and the subject vehicle for executing a travel assist. The above configuration can give the nearest rear vehicle a priority of the transmission of the necessary-position information-item necessary for obtaining the position relation with the subject vehicle; the nearest rear vehicle has a stronger demand which obtains such position relation with the subject vehicle for executing a travel assist.

In addition, when the rear vehicle determination process determines that several rear vehicles are present, the necessary-position determination process may determine the necessary-position information-item with respect to each of the rear vehicles (referred to as modification 2). In this case, the first simple transmission process transmits the locus information-set, which contains (i) the present position information-item of the subject vehicle, and (ii) the position information-item determined in the necessary-position determination process with respect to each of the rear vehicles.

Figure 6:
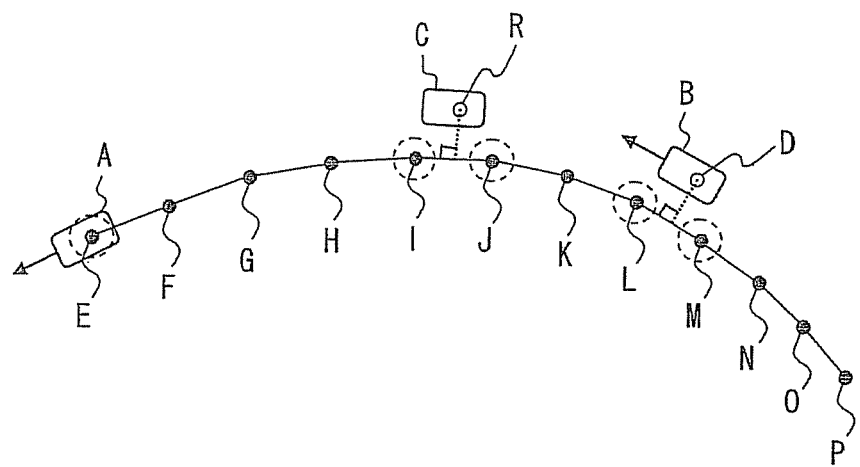
FIG. 6 is a diagram for explaining a locus information-set that is transmitted in a first simple transmission process according to modification 2.

The following will explain an example of the locus information-set transmitted in the first simple transmission process in the configuration of the modification 2 with reference to FIG. 6. FIG. 6 illustrates the vehicle A, the vehicle B, and the vehicle C. In addition, the present position information-item of the vehicle A is illustrated as E. The present position information-item of the vehicle B is illustrated as D. The present position information-item of the vehicle C is illustrated as R. The past position information-items of the vehicle A are illustrated as F to P. Furthermore, the end points of the closest line segment with respect to the vehicle B are illustrated as L and M. Furthermore, the end points of the closest line segment with respect to the vehicle C are illustrated as I and J. The position information-items of the points surrounded with the circles of the broken lines are transmitted from the vehicle A.

According to the configuration of the modification 2, the transmitted locus information-set contains (i) the present position information-item of the point E of the vehicle A; (ii) the position information-items of the end points L and M of the closest line segment with respect to the vehicle B; and (iii) the position information-items of the end points 1 and 3 of the closest line segment with respect to the vehicle C. Another configuration may be provided by combining the modification 1 with the modification 2.

It is noted that in the first embodiment and the modification 1, the necessary-position determination process selects the end points of the closest line segment or the closest point. There is no need to be limited to the above. For example, instead of selecting the end points of the closest line segment or the closest point, a point located near the present position of a rear vehicle may be selected.

Second Embodiment

The present disclosure is not limited to the above-mentioned embodiment; the following embodiment (i.e., a second embodiment) may be also contained in the technical scope of the present disclosure. The following will explain a second embodiment. To simplify the explanation of the present modification, an element or component having the same function as that of the element or component explained in the foregoing embodiment is assigned with the same reference number as that in the foregoing embodiment and omitted from the following explanation.

The configuration of the second embodiment is the same as the configuration of the first embodiment except for the necessary-position determination process by the control circuit 12.

The necessary-position determination process by the control circuit 12 of the second embodiment is performed as follows, for example. First, an estimated future locus of a rear vehicle at the back of the subject vehicle is determined. The control circuit 12 may be also referred to as a rear-vehicle locus determination section or means. For instance, the estimated future locus may be determined based on a turning radius of the rear vehicle estimated from the received vehicle information-set.

The estimation of the turning radius may be made based on the vehicle speed and steering angle included in the vehicle information-set of the rear vehicle with a well-known method, or based on the vehicle speed and yaw rate in the vehicle information-set of the rear vehicle with a well-known method. In addition, a curvature radius may be calculated for an approximated curve of the locus which connects the present position and the past positions of the rear vehicle; the curvature radius may be estimated as the turning radius.

Otherwise, the memory such as the ROM of the control circuit 12 may previously store the correspondence relation between the steering angle and turning radius, which are obtained by actual measurements or data interpolation; the turning radius may be estimated from the steering angle of the target vehicle based on this correspondence relation. The estimated future locus may be prepared as being along an arc having that turning radius. Therefore, the vehicle speed, the steering angle, the yaw rate, the position information-item may be referred to as a future locus estimation information-item.

In addition, the necessary-position determination process estimates an estimated position of a rear vehicle after a predetermined time (for example, 100 msec) elapses based on the vehicle speed included in the received vehicle information-set of the rear vehicle and the estimated future locus of the rear vehicle having been determined.

Subsequently, position information-items of first estimated end points of a closest line segment are determined; the first estimated end points are end points of a designated line segment in the past locus of the subject vehicle. The designated line segment intersects with a designated perpendicular line from the estimated position of the rear vehicle. The determined position information-items of the first estimated end points of the closest line segment are selected from the multiple past position information-items of the subject vehicle accumulated in the above-mentioned memory. The selected position information-items are determined as the necessary-position information-item of points necessary for a rear vehicle to obtain a position relation with the subject vehicle. That is, as the vehicle speed of the rear vehicle becomes greater, the position information-items of points located at positions moved further frontward in the estimated future locus from the present position of the rear vehicle are selected.

Figure 7:
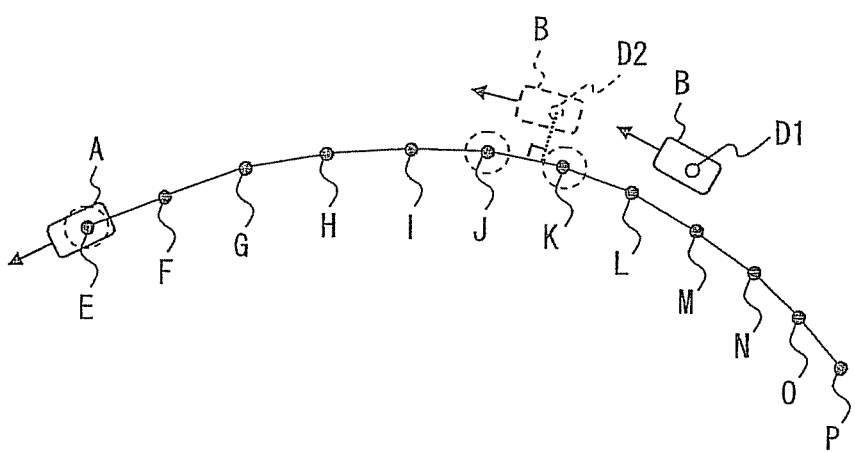
FIG. 7 is a diagram for explaining a locus information-set that is transmitted in a first simple transmission process according to a second embodiment.

The following will explain an example of the locus information-set transmitted in the first simple transmission process according to the second embodiment with reference to FIG. 7. FIG. 7 illustrates the vehicle A and the vehicle B. In addition, the present position information-item of the vehicle A is illustrated as E. The present position information-item of the vehicle B is illustrated as D1. The estimated position information-item of the vehicle B is illustrated as D2. The past position information-items of the vehicle A are illustrated as F to P. Furthermore, the first estimated end points of the closest line segment with respect to the vehicle B are illustrated as J and K. The position information-items of the points surrounded with the circles of the broken lines are transmitted from the vehicle A to the vehicle B.

According to the configuration of the second embodiment, the transmitted locus information-set contains (i) the present position information-item of the point E of the vehicle A; and (ii) the position information-items of the first estimated end points J and K of the closest line segment with respect to the vehicle B. Therefore, the same effect as that of the first embodiment may be provided. In addition, according to the configuration of the second embodiment, the position information-items of the points may be transmitted to permit the rear vehicle to obtain the position relation with the subject vehicle at the estimated position after the predetermined time period (for example, 100 msec) elapses. Further, the configuration of the second embodiment may be combined with the configuration of the modification 1 or modification 2.

Third Embodiment

The present disclosure is not limited to the above-mentioned embodiments; the following embodiment (i.e., a third embodiment) may be also contained in the technical scope of the present disclosure. The following will explain a third embodiment. To simplify the explanation of the present modification, an element or component having the same function as that of the element or component explained in the foregoing embodiment is assigned with the same reference number as that in the foregoing embodiment and omitted from the following explanation.

The configuration of the third embodiment is the same as the configuration of the first embodiment except for the rear vehicle determination process and the necessary-position determination process by the control circuit 12.

The rear vehicle determination process by the control circuit 12 of the third embodiment is performed as follows, for example. First, an estimated future locus of a rear vehicle is determined. The estimated future locus may be determined similarly to that in the second embodiment. Then, the shortest distance between the line segment included in the past locus of the subject vehicle and the estimated future locus of the target vehicle is calculated.

For example, when the estimated future locus of the rear vehicle and the past locus of the subject vehicle intersects each other, the shortest distance is calculated as zero (0). In addition, the estimated future locus of the rear vehicle and the past locus of the subject vehicle may not intersect each other. In this case, the shortest distance between the estimated future locus of the rear vehicle and the past locus of the subject vehicle may be estimated with a well-known method such as MBR (Minimum Bounding Rectangle).

Then, it is determined whether the calculated shortest distance is equal to or less than a predetermined distance. The predetermined distance may be a value designated as needed; for instance, it may be similar to an error of measurement of the present position of the subject vehicle by the position detection unit 2. In addition, whether a target vehicle is present at the back of the subject vehicle is determined similarly to that of the first embodiment.

The rear vehicle determination process according to the third embodiment determines that the target vehicle is a rear vehicle when the following two conditions are satisfied simultaneously: (i) the closest distance is equal to or less than a predetermined distance and (ii) the target vehicle is present at the back of the subject vehicle. In addition, when one of the above conditions is not satisfied, it is determined that the target vehicle is not a rear vehicle with respect to the subject vehicle. When the estimated future locus of the rear vehicle and the past locus of the subject vehicle do not intersect each other, it may be determined that the target vehicle is not a rear vehicle with respect to the subject vehicle.

The necessary-position determination process by the control circuit 12 of the third embodiment is performed as follows, for example. First, position information-items of second estimated end points of the closest line segment are determined; the second estimated end points of the closest line segment are end points of a designated line segment in the past locus of the subject vehicle closest to the estimated future locus of the rear vehicle. The control circuit 12 may be also referred to as a second closest point determination section or means.

For example, the estimated future locus of the rear vehicle and the past locus of the subject vehicle may intersect each other at a designated intersecting point. In this case, a line segment having the designated intersecting point in the past locus of the subject vehicle is designated; position information-items of the end points of the designated line segment are determined. For example, the estimated future locus of the rear vehicle and the past locus of the subject vehicle may not intersect each other. In this case, a line segment having the point at which the closest distance between the past locus of the subject vehicle and the estimated future locus of the rear vehicle is designated; position information-items of the end points of the designated line segment are determined.

The determined position information-items of the second estimated end points of the closest line segment are selected from the multiple past position information-items of the subject vehicle accumulated in the above-mentioned memory, and determined as the necessary-position information-item. Further, when the estimated future locus of the rear vehicle and the past locus of the subject vehicle may not intersect each other, the above-mentioned second simple transmission process or usual transmission process may be performed, without determining (i) the position information-items of the second estimated end points of the closest line segment and (ii) the necessary-position information-item.

A rear vehicle (e.g., vehicle B) may receive the vehicle information-set of the subject vehicle (e.g., vehicle A) transmitted from the control circuit 12 in the first simple transmission process according to the third embodiment. The travel assist ECU 4 of the vehicle B obtains a future position relation between the vehicle A and the vehicle B and executes a travel assist application mentioned above based on the received vehicle information-set of the vehicle A and the vehicle information-set of the vehicle B obtained from the position detection unit 2 or steering angle sensor 3 of the vehicle B.

For instance, the locus information-set contained in the vehicle information-set of the vehicle A may contain the present position information-item and two position information-items of the second estimated end points of the closest line segment. In this case, the shortest distance is obtained between (i) the line segment defined by the two second estimated end points and (ii) the estimated future locus of the vehicle B. A position at which the shortest distance is obtained is calculated as the closest position. Whether the vehicle A is a front vehicle ahead of the vehicle B may be determined based on (i) the calculated shortest distance and (ii) the heading directions of the vehicle A and vehicle B at the closest position.

That is, this is the case that the contents of the locus information-set transmitted from the vehicle A are limited to the present position information-item of the vehicle A and two second estimated end points of the closest line segment. Even in this case, the vehicle B can obtain a future position relation between the vehicle A and the vehicle B and execute a travel assist application mentioned above.

Figure 8:
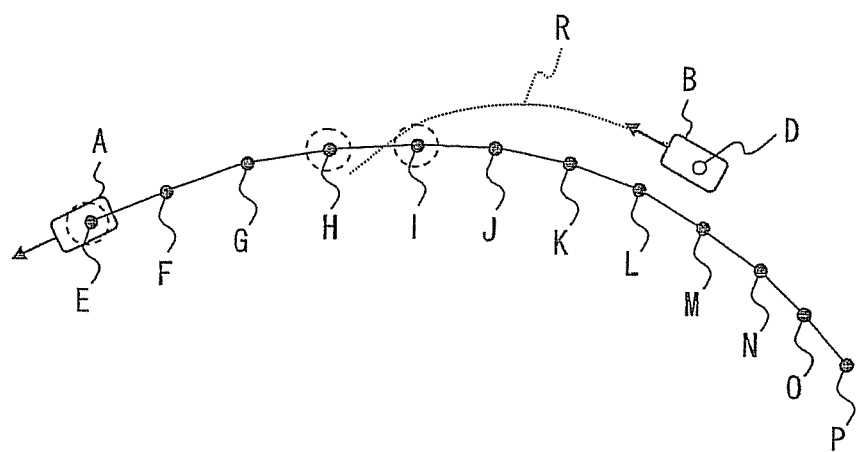
FIG. 8 is a diagram for explaining a locus information-set that is transmitted in a first simple transmission process according to a third embodiment.

The following will explain an example of the locus information-set transmitted in the first simple transmission process according to the third embodiment with reference to FIG. 8. FIG. 8 illustrates the vehicle A and the vehicle B. In addition, the present position information-item of the vehicle A is illustrated as E. The present position information-item of the vehicle B is illustrated as D. The estimated future locus of vehicle B is illustrated as R. The past position information-items of the vehicle A are illustrated as F to P. Furthermore, the second estimated end points of the closest line segment with respect to the vehicle B are illustrated as H and I. The position information-items of the points surrounded with the circles of the broken lines are transmitted from the vehicle A to the vehicle B.

According to the configuration of the third embodiment, the transmitted locus information-set contains (i) the present position information-item of the point E of the vehicle A; and (ii) the position information-items of the second estimated end points H and I of the closest line segment with respect to the vehicle B. This configuration can provide an effect similar to that of the first embodiment, helping prevent the congestion in the vehicle-to-vehicle communication.

Further, the configuration of the third embodiment may be combined with the configurations of the first embodiment, the second embodiment, the modification 1, and the modification 2. That is, the transmitted locus information-set may further contain the position information-items of the second estimated end points of the closest line segment as the necessary-position information-item, in addition to (i) the present position information-item of the subject vehicle and (ii) the position information-items of the end points of the closest line segment, the closest point, and the first estimated end points of the closest line segment.

Further, the necessary-position determination process may be executed as follows (referred to as modification 3). The necessary-position determination process of the modification 3 calculates the coordinate of an estimated intersecting point at which the estimated future locus of the rear vehicle intersects with a designated line segment in the past locus of the subject vehicle, thereby preparing a position information-item corresponding to the estimated intersecting point. Then, the position information-item of the prepared estimated intersecting point is determined as the necessary-position information-item. The control circuit 12 may be also referred to as an intersecting position determination section or means. When the estimated intersecting point is not calculated, the above-mentioned second simple transmission process or usual transmission process may be performed.

Figure 9:
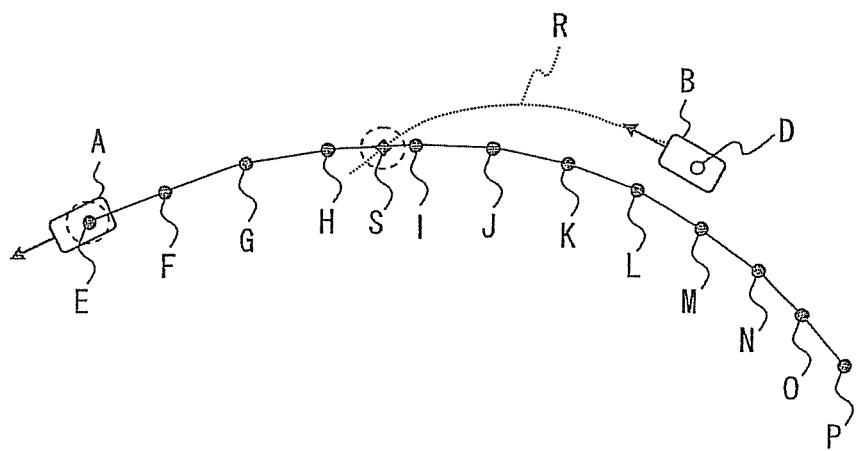
FIG. 9 is a diagram for explaining a locus information-set that is transmitted in a first simple transmission process according to modification 3.

The following will explain an example of the locus information-set transmitted in the first simple transmission process according to the modification 3 with reference to FIG. 9. FIG. 9 illustrates the vehicle A and the vehicle B. In addition, the present position information-item of the vehicle A is illustrated as E. The present position information-item of the vehicle B is illustrated as D. The estimated future locus of the vehicle B is illustrated as R. The past position information-items of the vehicle A are illustrated as F to P. In addition, the estimated intersecting point with respect to the vehicle B is illustrated as S. The position information-items of the points surrounded with the circles of the broken lines are transmitted from the vehicle A to the vehicle B.

According to the configuration of the modification 3, the transmitted locus information-set contains (i) the present position information-item E of the vehicle A; and (ii) the position information-item of the estimated intersecting point S with respect to the vehicle B. Therefore, the same effect as that of the modification 1 may be provided.

Further, the configuration of the modification 3 may be combined with the configurations of the first embodiment, the second embodiment, the modification 1, and the modification 2. That is, the transmitted locus information-set may further contain the position information-items of the estimated intersecting point as the necessary-position information-item, in addition to (i) the present position information-item of the subject vehicle and (ii) the position information-items of the end points of the closest line segment, the closest point, and the first estimated end points of the closest line segment.

Fourth Embodiment

The present disclosure is not limited to the above-mentioned embodiments; the following embodiment (i.e., a fourth embodiment) may be also contained in the technical scope of the present disclosure. The following will explain a fourth embodiment. To simplify the explanation of the present modification, an element or component having the same function as that of the element or component explained in the foregoing embodiment is assigned with the same reference number as that in the foregoing embodiment and omitted from the following explanation.

The configuration of the fourth embodiment is the same as the configuration of the first embodiment except for the necessary-position determination process by the control circuit 12.

The necessary-position determination process by the control circuit 12 of the fourth embodiment determines, as the necessary-position information-item, the position information-items of multiple n positions in the past locus of the subject vehicle in addition to the above-mentioned end points of the closest line segment. Those multiple n positions are obtained by tracing back chronologically along the past locus from the present position of the subject vehicle; n is a predetermined number that is designated as needed, for instance, two or three. The present embodiment designates two as the predetermined number n.

Figure 10:
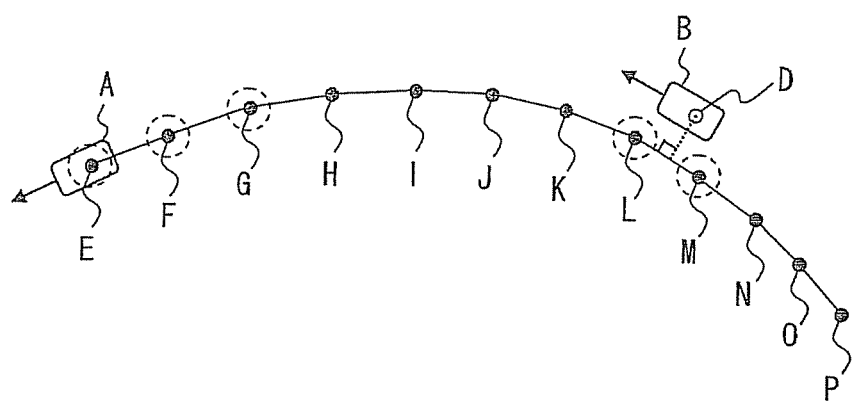
FIG. 10 is a diagram for explaining a locus information-set that is transmitted in a first simple transmission process according to a fourth embodiment.

The following will explain an example of the locus information-set transmitted in the first simple transmission process according to the fourth embodiment with reference to FIG. 10. FIG. 10 illustrates the vehicle A and the vehicle B. In addition, the present position information-item of the vehicle A is illustrated as E. The present position information-item of the vehicle B is illustrated as D. The past position information-items of the vehicle A are illustrated as F to P. Furthermore, the end points of the closest line segment with respect to the vehicle B are illustrated as L and M. The position information-items of the points surrounded with the circles of the broken lines are transmitted from the vehicle A to the vehicle B.

According to the configuration of the fourth embodiment, the transmitted locus information-set contains (i) the present position information-item of the point E of the vehicle A; (ii) the position information-items of the past two points F and G found by tracing back chronologically from the point E; and (iii) the position information-items of the end points L and M of the closest line segment with respect to the vehicle B.

For example, when all the past position information-items of the vehicle A accumulated in the above-mentioned memory are the position information-items of the points F to P, the usual transmission process transmits the position information-item of the point E and the position information-items of the points F to P as a locus information-set. In contrast, the configuration of the fourth embodiment can reduce the data amount of the transmitted locus information-set into the position information-items of the points E; F, and G and the position information-items of the points L and M that are the end points of the closest line segment.

Thus, according to the configuration of the fourth embodiment, when multiple position information-items of a subject vehicle are transmitted by vehicle-to-vehicle communication, a target vehicle as a transmission destination is permitted to obtain a position relation with the subject vehicle while helping prevent congestion in the vehicle-to-vehicle communication. Further, the configuration of the fourth embodiment may be combined with the configurations of the first embodiment, the second embodiment, the third embodiment, the modification 1, and the modification 2.

Fifth Embodiment

The present disclosure is not limited to the above-mentioned embodiments; the following embodiment (i.e., a fifth embodiment) may be also contained in the technical scope of the present disclosure. The following will explain a fifth embodiment. To simplify the explanation of the present modification, an element or component having the same function as that of the element or component explained in the foregoing embodiment is assigned with the same reference number as that in the foregoing embodiment and omitted from the following explanation.

The configuration of the fifth embodiment is the same as the configuration of the first embodiment except for the necessary-position determination process by the control circuit 12.

The necessary-position determination process by the control circuit 12 of the fifth embodiment is performed as follows, for example. First, similarly to the explanation of the first embodiment, the position information-items of the end points of the closest line segment are determined. Several points of the past locus excluding the points older than the determined end points of the closest line segment are designated; the position information-items of the designated several points are selected from the multiple past position information-items of the subject vehicle accumulated in the above-mentioned memory, and determined as the necessary-position information-item.

The first simple transmission process by the control circuit 12 according to the fifth embodiment transmits the vehicle information-set of the subject vehicle from the wireless communication portion 11 according to a transmission timing; this vehicle information-set includes the locus information-set containing (i) the position information-item determined as the necessary position information-item in the necessary-position information-item determination process, and (ii) the present position information-item.

Figure 11:
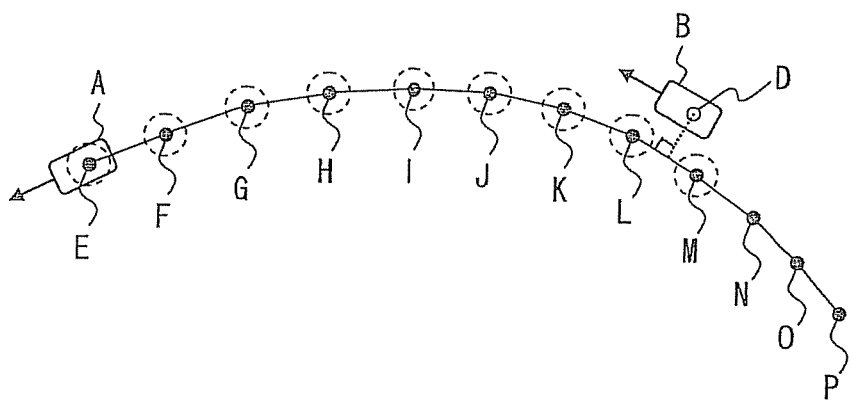
FIG. 11 is a diagram for explaining a locus information-set that is transmitted in a first simple transmission process according to a fifth embodiment.

The following will explain an example of the locus information-set transmitted in the first simple transmission process according to the fifth embodiment with reference to FIG. 11. FIG. 11 illustrates the vehicle A and the vehicle B. In addition, the present position information-item of the vehicle A is illustrated as E. The present position information-item of the vehicle B is illustrated as D. The past position information-items of the vehicle A are illustrated as F to P. Furthermore, the end points of the closest line segment with respect to the vehicle B are illustrated as L and M. The position information-items of the points surrounded with the circles of the broken lines are transmitted from the vehicle A to the vehicle B.

According to the configuration of the fifth embodiment, the transmitted locus information-set contains (i) the position information-item of the point E; and (ii) the position information-items of the points F to M excluding the points N to P older than the points L and M among the points F to P.

For example, when all the past position information-items of the vehicle A accumulated in the above-mentioned memory are the position information-items of the points F to P, the usual transmission process transmits the position information-item of the point E and the position information-items of the points F to P as a locus information-set. In contrast, according to the configuration of the fifth embodiment, the transmitted locus information-set can be reduced to the position information-items of the points E to M.

Thus, according to the configuration of the fifth embodiment, when multiple position information-items of a subject vehicle are transmitted by vehicle-to-vehicle communication, a target vehicle as a transmission destination is permitted to obtain a position relation with the subject vehicle while helping prevent congestion in the vehicle-to-vehicle communication.

Further, the configuration of the fifth embodiment may be combined with the configuration of the second embodiment. That is, an estimated position of a rear vehicle after a predetermined time period (e.g., IOU msec) elapses is designated; estimated end points of the closest line segment in the past locus of the subject vehicle are designated with respect to the rear vehicle. Points are selected from all the points in the past locus of the subject vehicle by excluding the points older than the designated estimated end points of the closest line segment. Position information-items of the selected points are selected from the multiple past position information-items of the subject vehicle accumulated in the above-mentioned memory, and determined as the necessary-position information-item.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle, the vehicular wireless communication apparatus comprising:

a position acquisition portion that acquires continuously a position information-item of the subject vehicle;

a transmission portion that transmits a vehicle information-set including a locus information-set that includes past and present position information-items of the subject vehicle, continuously via vehicle-to-vehicle communication;

a reception portion that receives a vehicle information-set including a locus information-set that includes past and present position information-items of the different vehicle, from the different vehicular wireless communication apparatus in the different vehicle:

a subject-vehicle locus determination section that determines a past locus of the subject vehicle from a plurality of position information-items of the subject vehicle continuously acquired by the position acquisition portion;

a rear vehicle determination section that determines, based on (i) the past locus of the subject vehicle determined by the subject-vehicle locus determination section and (ii) the locus information-set of the different vehicle received by the reception portion, whether the different vehicle is a rear vehicle, the rear vehicle being located at back of the subject vehicle and within a predetermined range from the past locus of the subject vehicle;

a necessary-position determination section that determines a necessary-position information-item based on the plurality of position information-items of the subject vehicle when the different vehicle is determined to be the rear vehicle, the necessary-position information-item being necessary for the rear vehicle when the rear vehicle obtains a position relation with the subject vehicle; and a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section, wherein:

the necessary-position determination section selects the necessary-position information-item, from among a plurality of past position information-items of the subject vehicle continuously acquired by the position acquisition portion;

the necessary-position determination section selects, from among the plurality of past position information-items of the subject vehicle, nearby position information-items of n points near a present position of the rear vehicle, the n being equal to or less than a predetermined number; and the necessary-position determination section determines the nearby position information-items of the n points as the necessary-position information-item.

2. The vehicular wireless communication apparatus according to claim 1, wherein:

the subject-vehicle locus determination section determines, as the past locus of the subject vehicle, a group of line segments that are formed by connecting points indicated by the plurality of position information-items of the subject vehicle;

the necessary-position determination section includes a first closest point determination section, which determines position information-items of two end points of a line segment that is closest to the present position of the rear vehicle from the group of line segments determined by the subject-vehicle locus determination section;

the necessary-position determination section selects, from among the plurality of past position information-items of the subject vehicle, the position information-items of two end points determined by the first closest point determination section; and the necessary-position determination section determines the selected position information-items of two end points as the necessary-position information-item.

3. The vehicular wireless communication apparatus according to claim 1, wherein:

the transmission portion continuously transmits using the vehicle-to-vehicle communication the vehicle information-set that includes (i) a vehicle speed and (ii) a future locus estimation information-item that permits estimation of a future locus;

the vehicular wireless communication apparatus further comprises a rear-vehicle locus determination section that determines a future locus of the rear vehicle based on the future locus estimation information-item of the rear vehicle received by the reception portion from the different vehicular wireless communication apparatus in the different vehicle;

the necessary-position determination section selects position information-items of n points located at positions moved further frontward in the future locus of the rear vehicle from the present position of the rear vehicle, the n being equal to or less than a predetermined number, as the vehicle speed of the rear vehicle received by the reception portion from the different vehicle becomes greater; and the necessary-position determination section determines the selected position information-items of n points as the necessary-position information-item.

4. The vehicular wireless communication apparatus according to claim 1, wherein:

the necessary-position determination section determines the necessary-position information-item with respect to a nearest rear vehicle nearest to the subject vehicle among a plurality of the rear vehicles when the rear vehicle determination section determines that the plurality of the rear vehicles are present, the necessary-position information-item with respect to the nearest rear vehicle being necessary for the nearest rear vehicle when the nearest rear vehicle determines a position relation with the subject vehicle; and the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to the nearest rear vehicle determined by the necessary-position determination section.

5. The vehicular wireless communication apparatus according to claim 1, wherein:
the necessary-position determination section determines the necessary-position information-item with respect to each of a plurality of the rear vehicles when the rear vehicle determination section determines that the plurality of the rear vehicles are present, the necessary-position information-item with respect to each of the plurality of the rear vehicles being necessary for each of the plurality of the rear vehicles when each of the plurality of the rear vehicles determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to each of the plurality of the rear vehicles determined by the necessary-position determination section.

6. The vehicular wireless communication apparatus according to claim 1, wherein:
the necessary-position determination section determines, as the necessary-position information-item, also n past position information-items obtained by tracing back chronologically from the present position information-item along the past locus of the subject vehicle, the n being a predetermined number.

7. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle,
the vehicular wireless communication apparatus comprising:
a position acquisition portion that acquires continuously a position information-item of the subject vehicle;
a transmission portion that transmits a vehicle information-set including a locus information-set that includes past and present position information-items of the subject vehicle, continuously via vehicle-to-vehicle communication;
a reception portion that receives a vehicle information-set including a locus information-set that includes past and present position information-items of the different vehicle, from the different vehicular wireless communication apparatus in the different vehicle;
a subject-vehicle locus determination section that determines a past locus of the subject vehicle from a plurality of position information-items of the subject vehicle continuously acquired by the position acquisition portion;
a rear vehicle determination section that determines, based on (i) the past locus of the subject vehicle determined by the subject-vehicle locus determination section and (ii) the locus information-set of the different vehicle received by the reception portion, whether the different vehicle is a rear vehicle,
the rear vehicle being located at back of the subject vehicle and within a predetermined range from the past locus of the subject vehicle;
a necessary-position determination section that determines a necessary-position information-item based on the plurality of position information-items of the subject vehicle when the different vehicle is determined to be the rear vehicle,
the necessary-position information-item being necessary for the rear vehicle when the rear vehicle obtains a position relation with the subject vehicle; and
a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section,
wherein:
the necessary-position determination section includes a closest point preparation section, which prepares a position information-item of a point closest to a present position of the rear vehicle within the past locus of the subject vehicle; and
the necessary-position determination section determines the position information-item prepared by the closest point preparation section as the necessary-position information-item.

8. The vehicular wireless communication apparatus according to claim 7, wherein:
the necessary-position determination section determines the necessary-position information-item with respect to a nearest rear vehicle nearest to the subject vehicle among a plurality of the rear vehicles when the rear vehicle determination section determines that the plurality of the rear vehicles are present, the necessary-position information-item with respect to the nearest rear vehicle being necessary for the nearest rear vehicle when the nearest rear vehicle determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to the nearest rear vehicle determined by the necessary-position determination section.

9. The vehicular wireless communication apparatus according to claim 7, wherein:
the necessary-position determination section determines the necessary-position information-item with respect to each of a plurality of the rear vehicles when the rear vehicle determination section determines that the plurality of the rear vehicles are present, the necessary-position information-item with respect to each of the plurality of the rear vehicles being necessary for each of the plurality of the rear vehicles when each of the plurality of the rear vehicles determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to each of the plurality of the rear vehicles determined by the necessary-position determination section.

10. The vehicular wireless communication apparatus according to claim 7, wherein:
the necessary-position determination section determines, as the necessary-position information-item, also n past position information-items obtained by tracing back chronologically from the present position information-item along the past locus of the subject vehicle, the n being a predetermined number.

11. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle,
the vehicular wireless communication apparatus comprising:
a position acquisition portion that acquires continuously a position information-item of the subject vehicle;
a transmission portion that transmits a vehicle information-set including a locus information-set that includes past and present position information-items of the subject vehicle, continuously via vehicle-to-vehicle communication;
a reception portion that receives a vehicle information-set including a locus information-set that includes past and present position information-items of the different vehicle, from the different vehicular wireless communication apparatus in the different vehicle;
a subject-vehicle locus determination section that determines a past locus of the subject vehicle from a plurality of position information-items of the subject vehicle continuously acquired by the position acquisition portion;
a rear vehicle determination section that determines, based on (i) the past locus of the subject vehicle determined by the subject-vehicle locus determination section and (ii) the locus information-set of the different vehicle received by the reception portion, whether the different vehicle is a rear vehicle,
the rear vehicle being located at back of the subject vehicle and within a predetermined range from the past locus of the subject vehicle;
a necessary-position determination section that determines a necessary-position information-item based on the plurality of position information-items of the subject vehicle when the different vehicle is determined to be the rear vehicle,
the necessary-position information-item being necessary for the rear vehicle when the rear vehicle obtains a position relation with the subject vehicle; and
a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section, wherein:
the subject-vehicle locus determination section determines, as the past locus of the subject vehicle, a group of line segments that are formed by connecting points indicated by the plurality of position information-items of the subject vehicle;
the transmission portion continuously transmits using the vehicle-to-vehicle communication the vehicle information-set that includes a future locus estimation information-item that permits estimation of a future locus;
the vehicular wireless communication apparatus further comprises a rear-vehicle locus determination section that determines a future locus of the rear vehicle based on a future locus estimation information-item of the rear vehicle received by the reception portion from the different vehicular wireless communication apparatus in the different vehicle;
the necessary-position determination section includes a second closest point determination section, which determines position information-items of two end points of a line segment that is closest to the future locus of the rear vehicle determined by the rear-vehicle locus determination section from the group of line segments determined by the subject-vehicle locus determination section;
the necessary-position determination section selects the position information-items of two end points determined by the second closest point determination section; and
the necessary-position determination section determines the selected position information-items of two end points as the necessary-position information-item.

12. The vehicular wireless communication apparatus according to claim 11, wherein:
the necessary-position determination section determines the necessary-position information-item with respect to a nearest rear vehicle nearest to the subject vehicle among a plurality of the rear vehicles when the rear vehicle determination section determines that the plurality of the rear vehicles are present, the necessary-position information-item with respect to the nearest rear vehicle being necessary for the nearest rear vehicle when the nearest rear vehicle determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to the nearest rear vehicle determined by the necessary-position determination section.

13. The vehicular wireless communication apparatus according to claim 11, wherein:
the necessary-position determination section determines the necessary-position information-item with respect to each of a plurality of the rear vehicles when the rear vehicle determination section determines that the plurality of the rear vehicles are present, the necessary-position information-item with respect to each of the plurality of the rear vehicles being necessary for each of the plurality of the rear vehicles when each of the plurality of the rear vehicles determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to each of the plurality of the rear vehicles determined by the necessary-position determination section.

14. The vehicular wireless communication apparatus according to claim 11, wherein:
the necessary-position determination section determines, as the necessary-position information-item, also n past position information-items obtained by tracing back chronologically from the present position information-item along the past locus of the subject vehicle, the n being a predetermined number.

15. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle,
the vehicular wireless communication apparatus comprising:
a position acquisition portion that acquires continuously a position information-item of the subject vehicle;
a transmission portion that transmits a vehicle information-set including a locus information-set that includes past and present position information-items of the subject vehicle, continuously via vehicle-to-vehicle communication;
a reception portion that receives a vehicle information-set including a locus information-set that includes past and present position information-items of the different vehicle, from the different vehicular wireless communication apparatus in the different vehicle;
a subject-vehicle locus determination section that determines a past locus of the subject vehicle from a plurality of position information-items of the subject vehicle continuously acquired by the position acquisition portion;
a rear vehicle determination section that determines, based on (i) the past locus of the subject vehicle determined by the subject-vehicle locus determination section and (ii) the locus information-set of the different vehicle received by the reception portion, whether the different vehicle is a rear vehicle,
the rear vehicle being located at back of the subject vehicle and within a predetermined range from the past locus of the subject vehicle;
a necessary-position determination section that determines a necessary-position information-item based on the plurality of position information-items of the subject vehicle when the different vehicle is determined to be the rear vehicle,
the necessary-position information-item being necessary for the rear vehicle when the rear vehicle obtains a position relation with the subject vehicle; and
a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section, wherein:
the transmission portion continuously transmits using the vehicle-to-vehicle communication the vehicle information-set that includes a future locus estimation information-item that permits estimation of a future locus;
the vehicular wireless communication apparatus further comprises
(i) a rear-vehicle locus determination section that determines a future locus of the rear vehicle based on a future locus estimation information-item of the rear vehicle received by the reception portion from the different vehicular wireless communication apparatus in the different vehicle, and
(ii) an intersecting position determination section that determines an estimated intersecting point at which the past locus of the subject vehicle determined by the subject-vehicle locus determination section intersects with the future locus of the rear vehicle determined by the rear-vehicle locus determination section; and
the necessary-position determination section determines a position information-item of the estimated intersecting point determined by the intersecting position determination section as the necessary-position information-item.

16. The vehicular wireless communication apparatus according to claim 15, wherein:
the necessary-position determination section determines the necessary-position information-item with respect to a nearest rear vehicle nearest to the subject vehicle among a plurality of the rear vehicles when the rear vehicle determination section determines that the plurality of the rear vehicles are present, the necessary-position information-item with respect to the nearest rear vehicle being necessary for the nearest rear vehicle when the nearest rear vehicle determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to the nearest rear vehicle determined by the necessary-position determination section.

17. The vehicular wireless communication apparatus according to claim 15, wherein:
the necessary-position determination section determines the necessary-position information-item with respect to each of a plurality of the rear vehicles when the rear vehicle determination section determines that the plurality of the rear vehicles are present, the necessary-position information-item with respect to each of the plurality of the rear vehicles being necessary for each of the plurality of the rear vehicles when each of the plurality of the rear vehicles determines a position relation with the subject vehicle; and
the transmission information control section controls the transmission portion to transmit a changed locus information-set of the subject vehicle when the plurality of the rear vehicles are determined to be present by the rear vehicle determination section, the changed locus information-set of the subject vehicle including (i) the present position information-item of the subject vehicle and (ii) the necessary-position information-item with respect to each of the plurality of the rear vehicles determined by the necessary-position determination section.

18. The vehicular wireless communication apparatus according to claim 15, wherein:
the necessary-position determination section determines, as the necessary-position information-item, also n past position information-items obtained by tracing back chronologically from the present position information-item along the past locus of the subject vehicle, the n being a predetermined number.

19. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle, the vehicular wireless communication apparatus comprising:
a position acquisition portion that acquires continuously a position information-item of the subject vehicle;
a transmission portion that transmits a vehicle information-set including a locus information-set that includes past and present position information-items of the subject vehicle, continuously via vehicle-to-vehicle communication;
a reception portion that receives a vehicle information-set including a locus information-set that includes past and present position information-items of the different vehicle, from the different vehicular wireless communication apparatus in the different vehicle;
a subject-vehicle locus determination section that determines a past locus of the subject vehicle from a plurality of position information-items of the subject vehicle continuously acquired by the position acquisition portion;
a rear vehicle determination section that determines, based on (i) the past locus of the subject vehicle determined by the subject-vehicle locus determination section and (ii) the locus information-set of the different vehicle received by the reception portion, whether the different vehicle is a rear vehicle,
the rear vehicle being located at back of the subject vehicle and within a predetermined range from the past locus of the subject vehicle;
a necessary-position determination section that determines a necessary-position information-item based on the plurality of position information-items of the subject vehicle when the different vehicle is determined to be the rear vehicle,
the necessary-position information-item being necessary for the rear vehicle when the rear vehicle obtains a position relation with the subject vehicle; and
a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section, wherein:
the subject-vehicle locus determination section determines, as the past locus of the subject vehicle, a group of line segments that are formed by connecting points indicated by the plurality of position information-items of the subject vehicle;
the necessary-position determination section includes a first closest point determination section, which determines position information-items of two end points of a line segment that is closest to the present position of the rear vehicle from the group of line segments determined by the subject-vehicle locus determination section;
the necessary-position determination section selects, from among a plurality of past position information-items of the subject vehicle, remaining position information-items excluding position information-items older than the position information-items of two end points determined by the first closest point determination section; and
the necessary-position determination section determines the selected remaining position information-items as the necessary-position information-item.

20. A vehicular wireless communication apparatus disposed in a subject vehicle, the subject vehicle cooperating with a different vehicle that includes a different vehicular wireless communication apparatus being identical in function to the vehicular wireless communication apparatus in the subject vehicle, the vehicular wireless communication apparatus comprising:
a position acquisition portion that acquires continuously a position information-item of the subject vehicle;
a transmission portion that transmits a vehicle information-set including a locus information-set that includes past and present position information-items of the subject vehicle, continuously via vehicle-to-vehicle communication;
a reception portion that receives a vehicle information-set including a locus information-set that includes past and present position information-items of the different vehicle, from the different vehicular wireless communication apparatus in the different vehicle;
a subject-vehicle locus determination section that determines a past locus of the subject vehicle from a plurality of position information-items of the subject vehicle continuously acquired by the position acquisition portion;
a rear vehicle determination section that determines, based on (i) the past locus of the subject vehicle determined by the subject-vehicle locus determination section and (ii) the locus information-set of the different vehicle received by the reception portion, whether the different vehicle is a rear vehicle,
the rear vehicle being located at back of the subject vehicle and within a predetermined range from the past locus of the subject vehicle;
a necessary-position determination section that determines a necessary-position information-item based on the plurality of position information-items of the subject vehicle when the different vehicle is determined to be the rear vehicle,
the necessary-position information-item being necessary for the rear vehicle when the rear vehicle obtains a position relation with the subject vehicle; and
a transmission information control section that controls the transmission portion to transmit the locus information-set of the subject vehicle when the different vehicle is determined to be the rear vehicle such that the locus information-set of the subject vehicle includes (i) a present position information-item of the subject vehicle and (ii) the necessary-position information-item determined by the necessary-position determination section, wherein:
the necessary-position determination section determines, as the necessary-position information-item, also n past position information-items obtained by tracing back chronologically from the present position information-item along the past locus of the subject vehicle, the n being a predetermined number.

* * * * *